Figure 1:
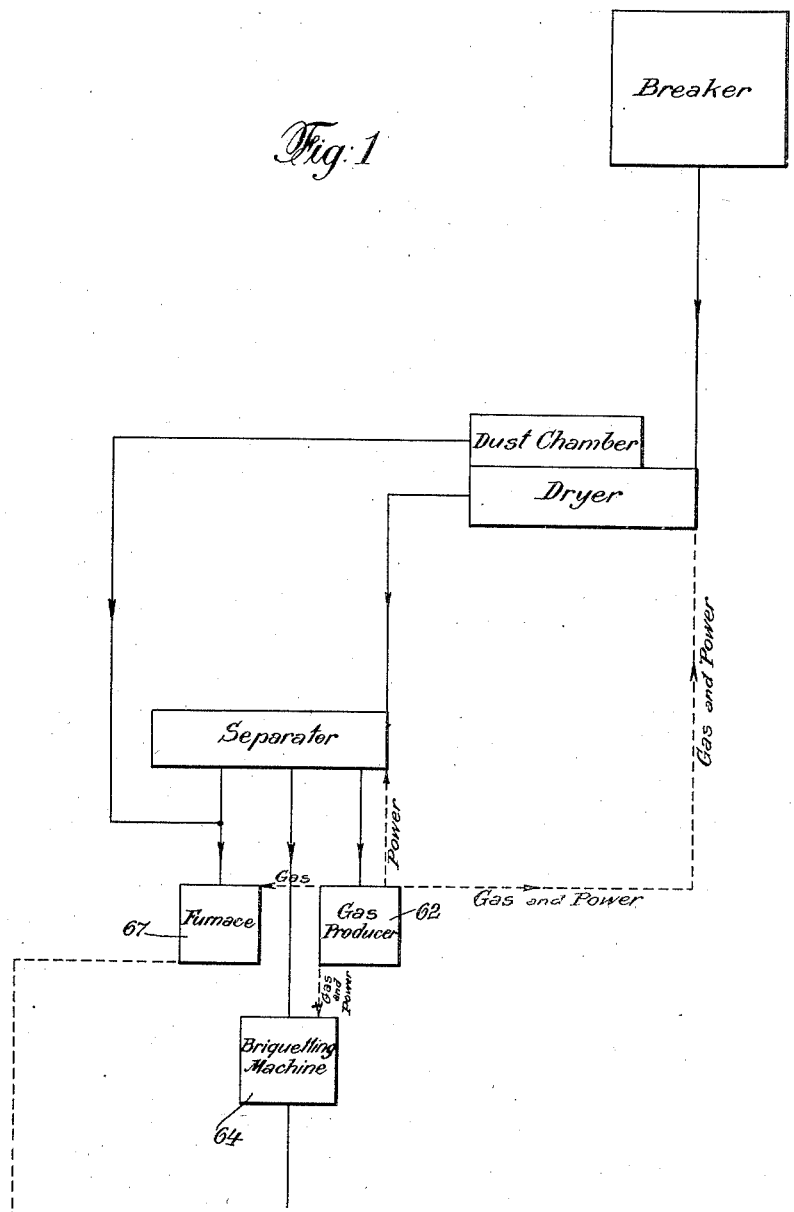

G. B. DAMON.
APPARATUS FOR BRIQUETING FINE COAL AND THE WASTE MATERIALS THEREOF.
APPLICATION FILED AUG. 8, 1908.

914,247. Patented Mar. 2, 1909.
10 SHEETS—SHEET 1.

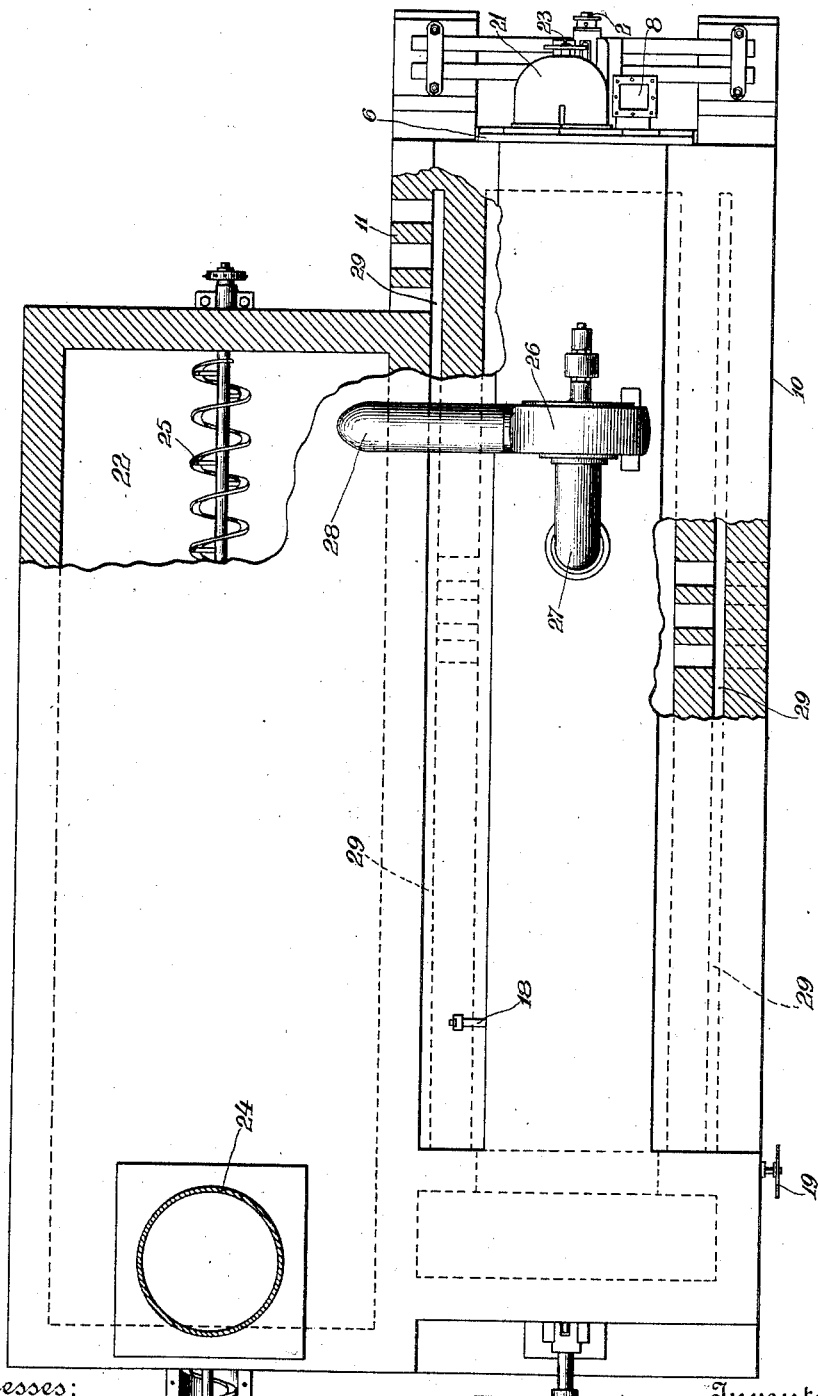

G. B. DAMON.
APPARATUS FOR BRIQUETING FINE COAL AND THE WASTE MATERIALS THEREOF.
APPLICATION FILED AUG. 8, 1908.
914,247.
Patented Mar. 2, 1909.
10 SHEETS—SHEET 3.
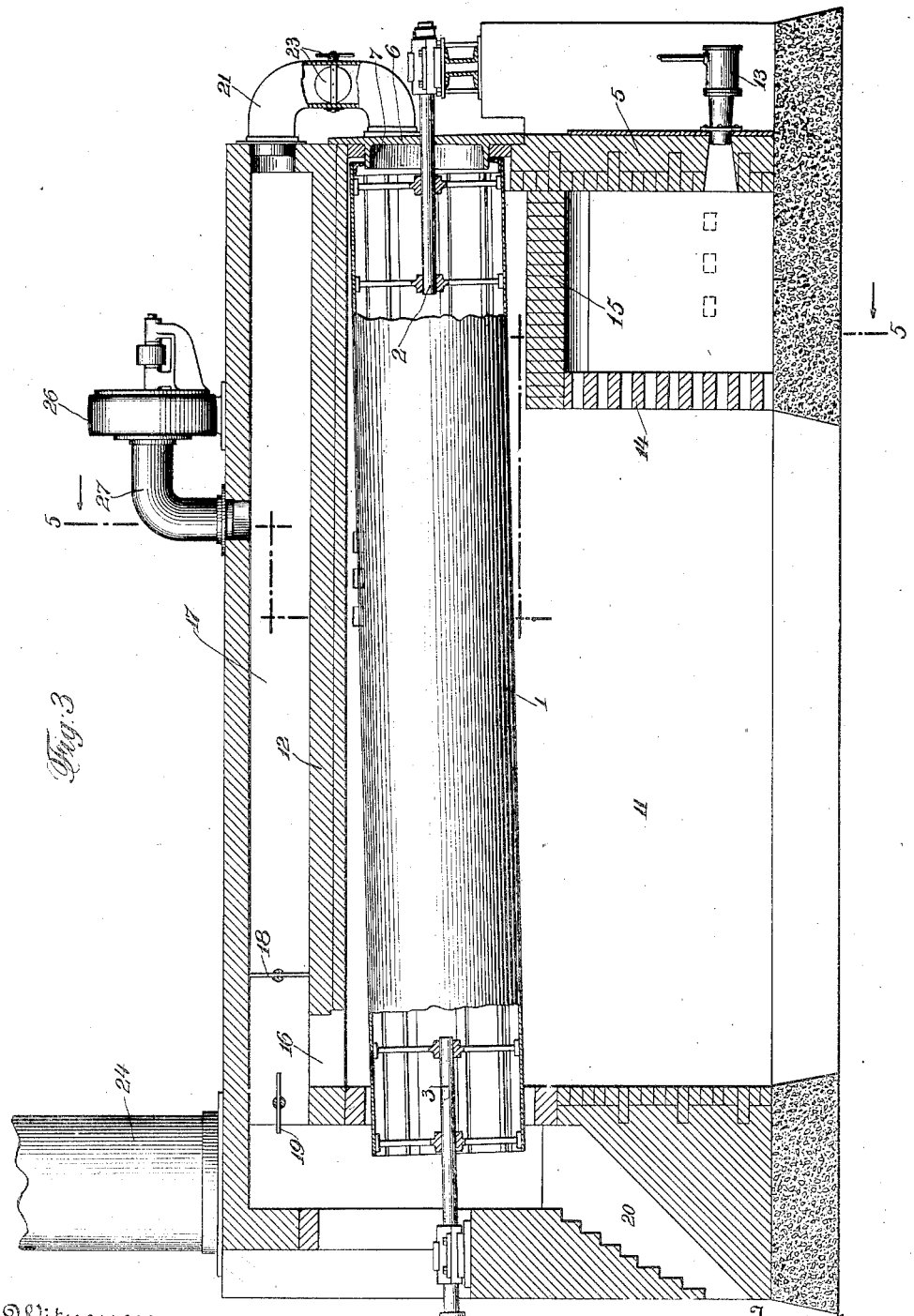

G. B. DAMON.
APPARATUS FOR BRIQUETING FINE COAL AND THE WASTE MATERIALS THEREOF.
APPLICATION FILED AUG. 8, 1908.
914,247.
Patented Mar. 2, 1909.
10 SHEETS—SHEET 4.
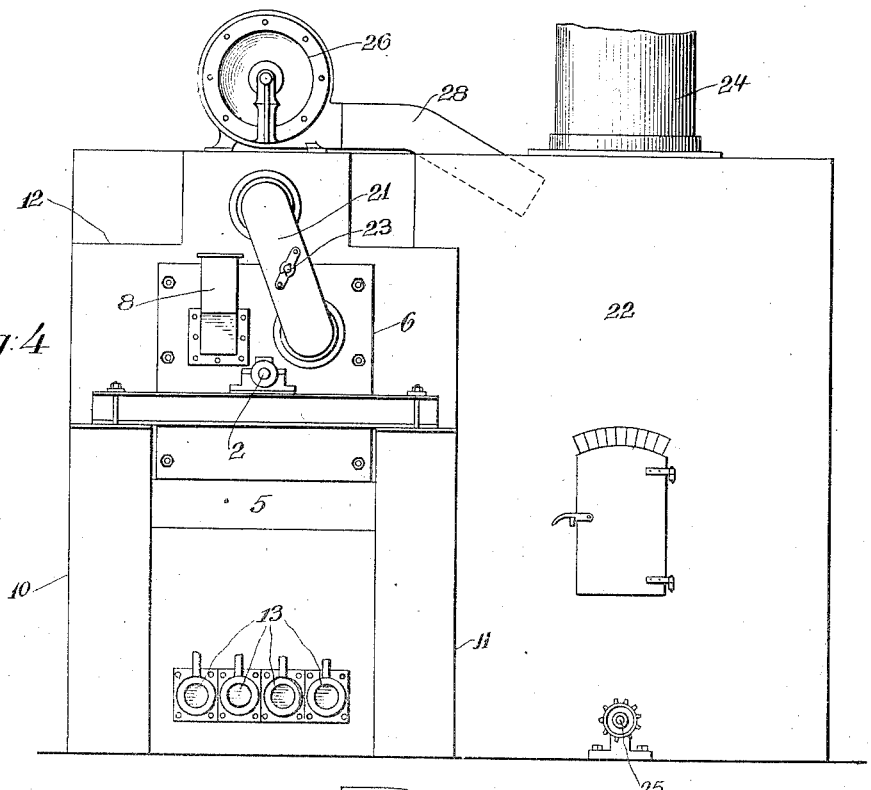
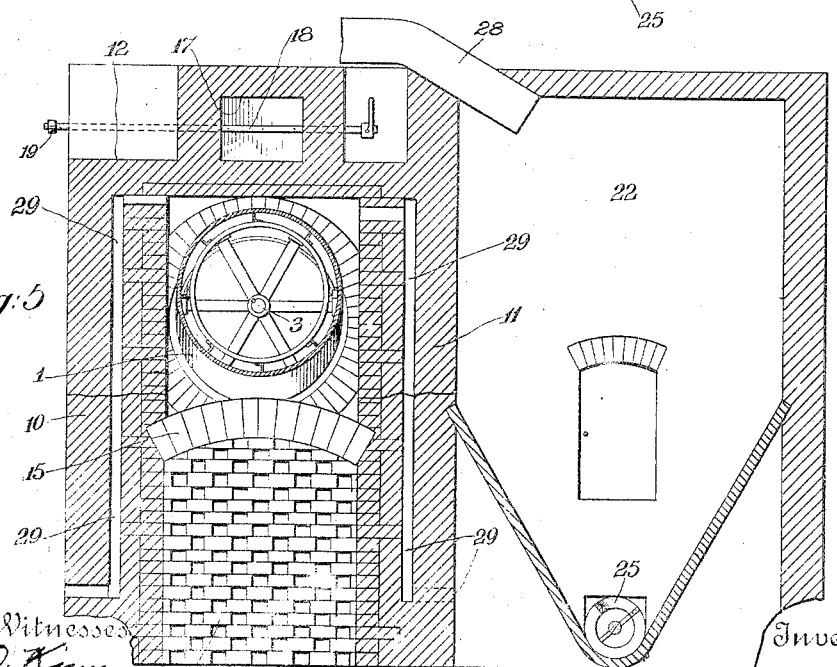

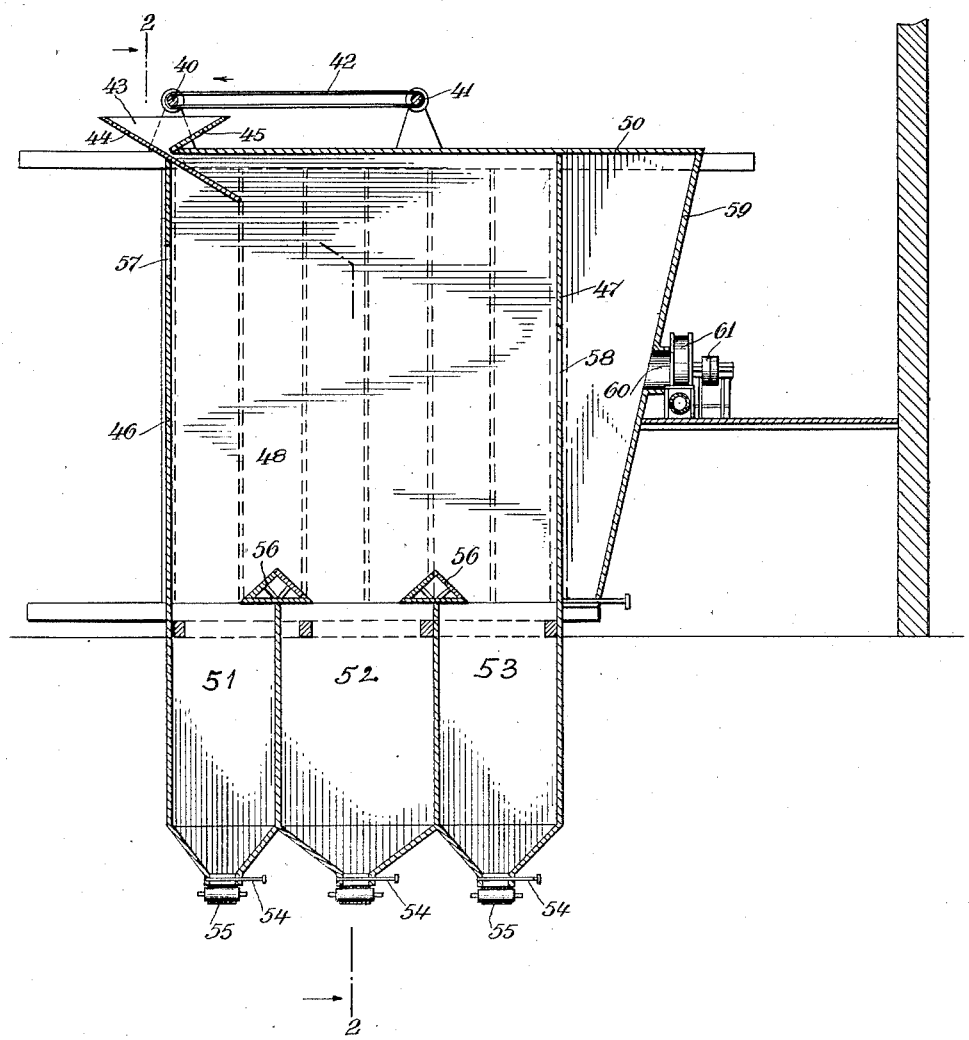

G. B. DAMON.
APPARATUS FOR BRIQUETING FINE COAL AND THE WASTE MATERIALS THEREOF.
APPLICATION FILED AUG. 8, 1908.
914,247.
Patented Mar. 2, 1909.
10 SHEETS—SHEET 6.
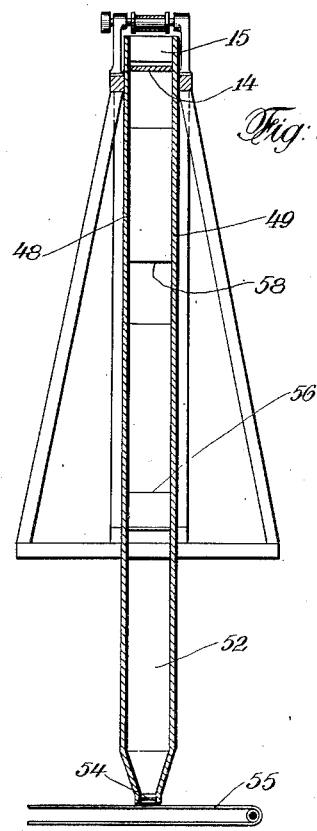
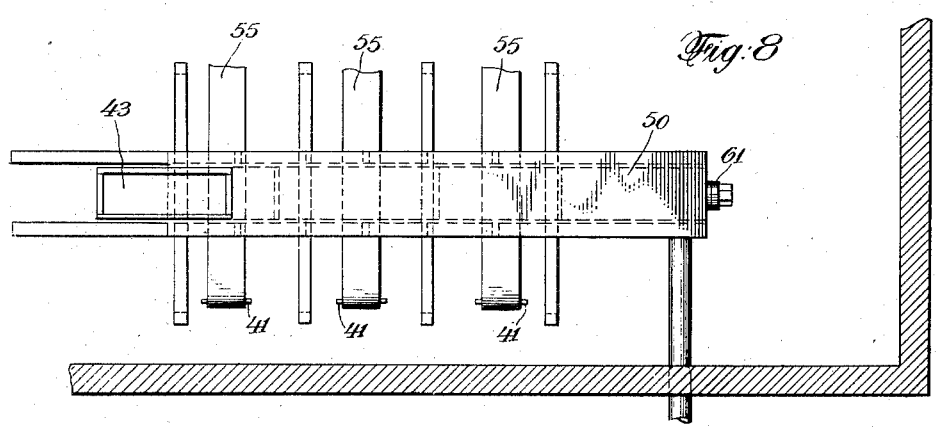

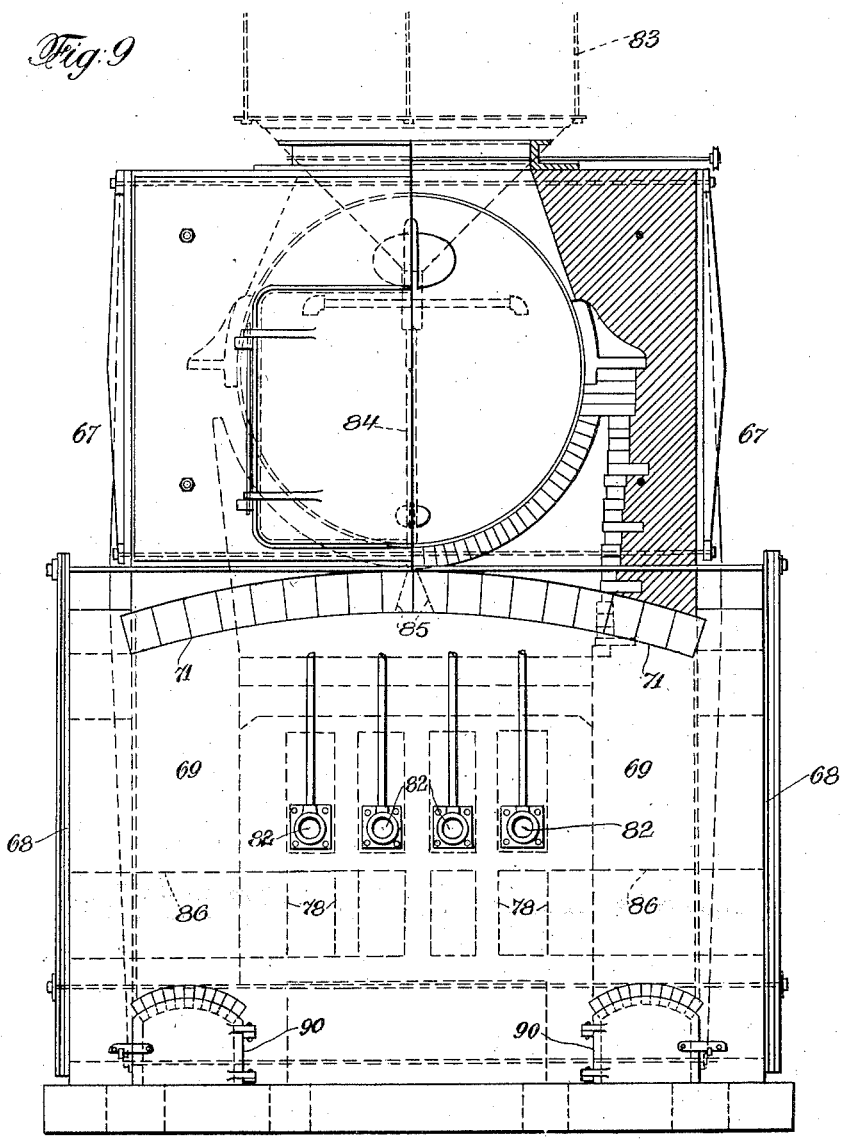

G. B. DAMON.
APPARATUS FOR BRIQUETING FINE COAL AND THE WASTE MATERIALS THEREOF.
APPLICATION FILED AUG. 8, 1908.

914,247.

Patented Mar. 2, 1909.

10 SHEETS—SHEET 8.

Witnesses:

Inventor
George B. Damon,
By his Attorneys
Prindle and Wright.

G. B. DAMON.
APPARATUS FOR BRIQUETING FINE COAL AND THE WASTE MATERIALS THEREOF.
APPLICATION FILED AUG. 8, 1908.
914,247.
Patented Mar. 2, 1909.
10 SHEETS—SHEET 9.
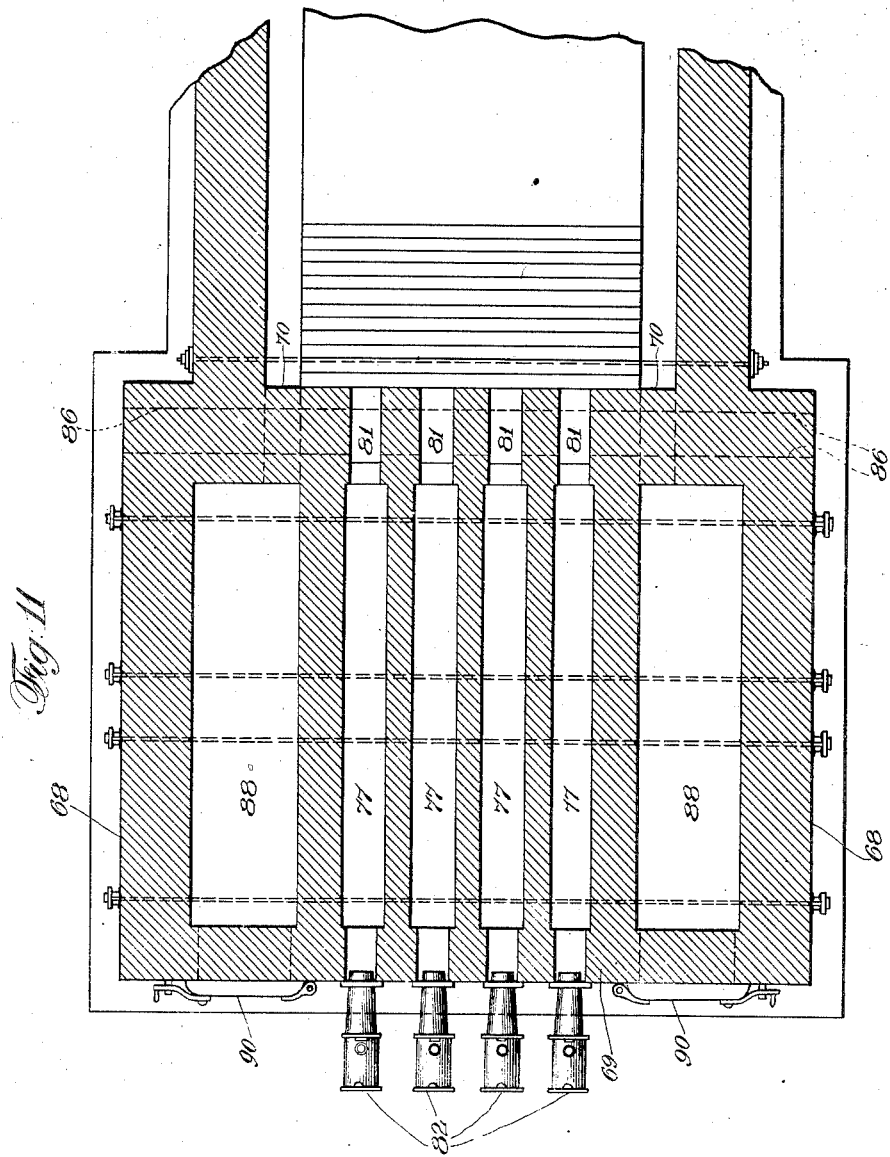

G. B. DAMON.
APPARATUS FOR BRIQUETING FINE COAL AND THE WASTE MATERIALS THEREOF.
APPLICATION FILED AUG. 8, 1908.
914,247.
Patented Mar. 2, 1909.
10 SHEETS—SHEET 10.
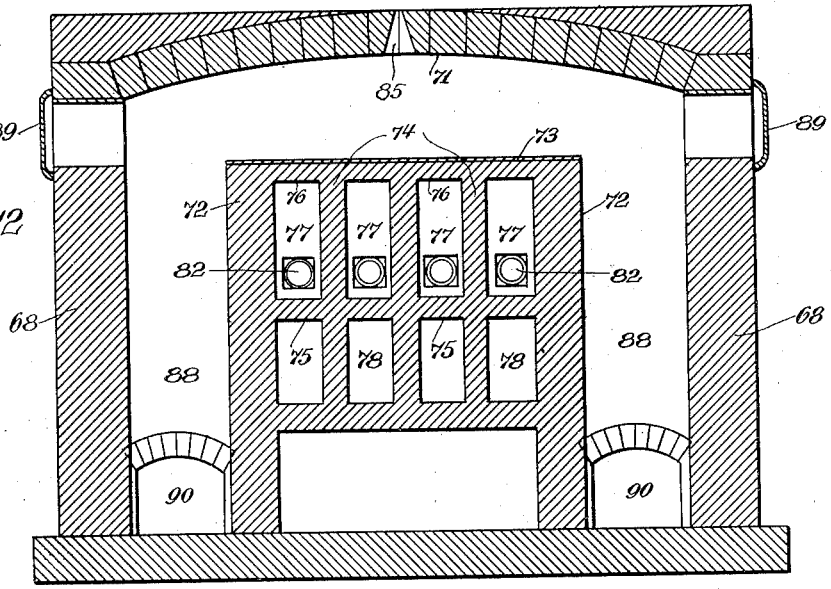
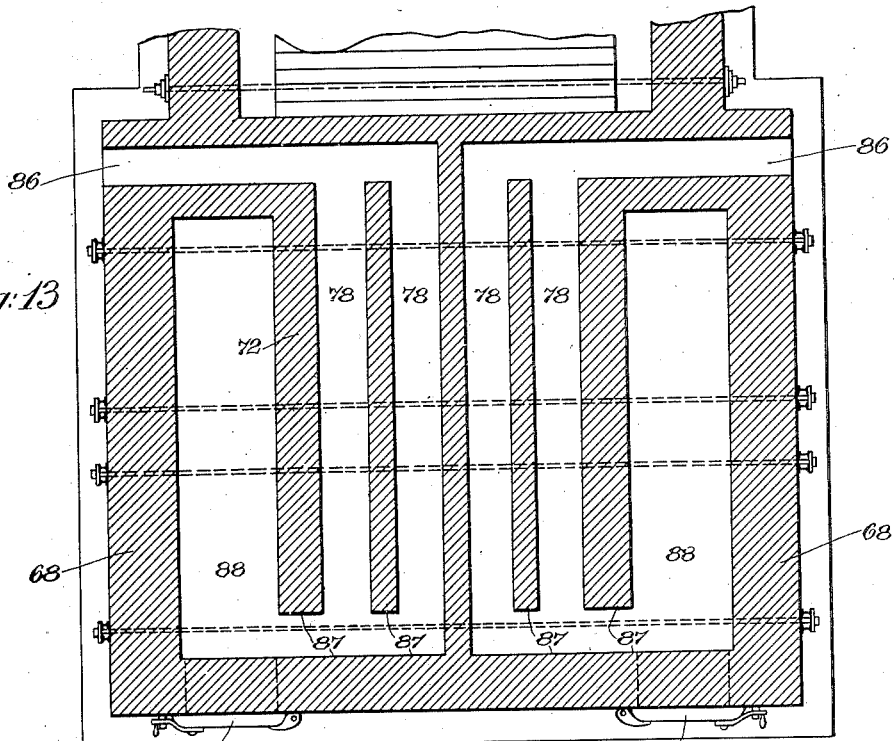

UNITED STATES PATENT OFFICE.

GEORGE BERNHARDT DAMON, OF GLENSIDE, PENNSYLVANIA.

APPARATUS FOR BRIQUETING FINE COAL AND THE WASTE MATERIALS THEREOF.

No. 914,247.            Specification of Letters Patent.            Patented March 2, 1909.

Application filed August 8, 1908. Serial No. 447,627.

*To all whom it may concern:*

Be it known that I, GEORGE B. DAMON, of Glenside, in the county of Montgomery and in the State of Pennsylvania, have invented a certain new and useful Improvement in Apparatus for Briqueting Fine Coal and the Waste Materials Thereof, and do hereby declare that the following is a full, clear, and exact description thereof.

The object of my invention has been to provide an apparatus for preparing for briqueting and briqueting fine anthracite and bituminous coal, and anthracite and bituminous waste materials, which shall have among others the advantages hereinafter stated. By "fine" anthracite coal, I mean coal not substantially larger than "buckwheat", and by "fine" bituminous coal, I mean coal of a size corresponding to "buckwheat" in anthracite coal. Among the said advantages are: that of operating upon such materials in a dry condition; that of both operating upon such materials in a dry condition, and being continuous and uninterrupted in its operation on them; that of not washing the materials at any stage of the process; that of utilizing substantially all of the carbon in the said materials; that of obtaining all the heat and power required for its operation from the material being treated, and especially the portions thereof not useful for briqueting; that of not only obtaining the heat and power for its own operation from the waste portion of the material being treated, but also of supplying power from such waste materials for purposes not connected with such apparatus; and to such ends my invention consists in the apparatus for briqueting coal and the waste materials thereof hereinafter specified.

Figure 10:
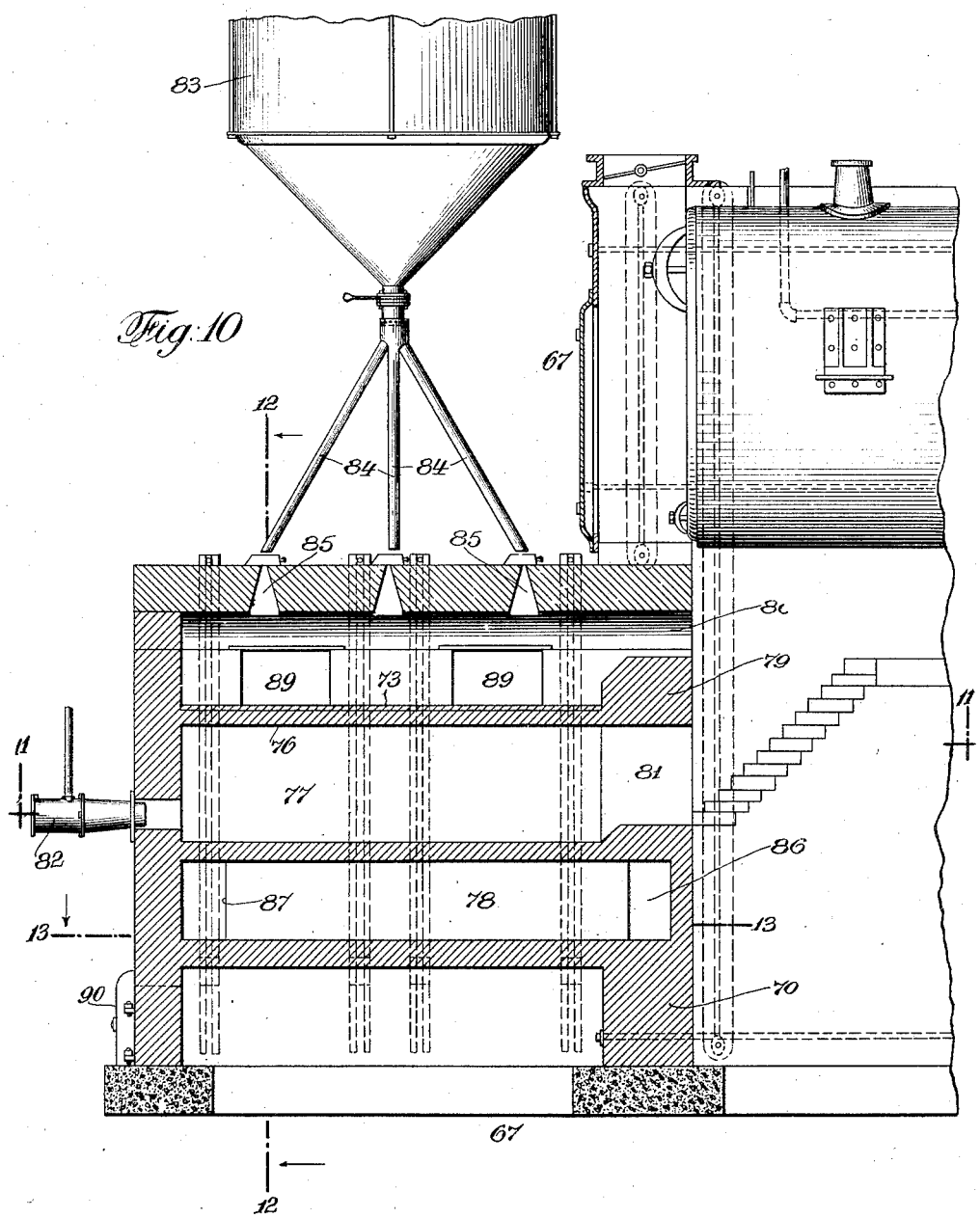

In the accompanying drawings Figure 1 is a diagrammatic view of one form of my apparatus; Figs. 2 and 3 are respectively a side elevation, and a vertical sectional view of a drier forming a part of said apparatus; Fig. 4 is a front view of the drier; Fig. 5 is a transverse sectional view of the said drier; Figs. 6, 7 and 8 are respectively a vertical longitudinal sectional view, a vertical transverse sectional view, and a plan view of the separator adapted for use with my apparatus; Fig. 9 is a front elevation partly broken away of a furnace adapted for use with my said apparatus; Fig. 10 is a vertical longitudinal sectional view of said furnace and the boiler to which it is applied; Figs. 11, 12 and 13 are views taken on the correspondingly numbered section lines of Fig. 10.

In the production of anthracite coal, the coal is mined in as large lumps as possible, and is then passed through a breaker to break it up into smaller sizes, and to assort and clean the coal. This results in the production of a considerable percentage of coal that is too small for satisfactory sale because of the competition of bituminous coal. By my apparatus, this small coal when crushed down to a suitable size for briqueting can have its particles assorted as to size, its dust removed, and the percentage of incombustible material can be reduced, if necessary, and the useful material then briqueted. The mining of anthracite coal also results in the production of a large amount of coal containing dust and coal too small for satisfactory combustion by the ordinary processes. This material is known as "culm". The culm is too high in incombustible material for satisfactory combustion by the ordinary apparatus. It is also too fine to burn satisfactorily on a grate. I desire by the use of my apparatus to make briquets from culm which shall burn substantially as well as the domestic sizes of coal.

In order to produce satisfactory briquets from culm, it is not only necessary that the percentage of incombustible material should be reduced, but that the particles below a certain size should be removed, because the amount of pitch necessary to bind the particles into a briquet is proportionately larger for small particles than for large particles, as the amount of pitch necessary to coat a small particle is proportionately larger than to coat a large particle. Pitch is expensive and it is therefore not economical to make briquets of material that is too fine. Therefore, another object of my invention has been to provide apparatus to remove the dust which is too fine for use in briquets. It is also desirable that the particles of a briquet shall be of substantially uniform size, because this is necessary to secure satisfactory combustion of the briquet under ordinary circumstances. The larger particles will burn more slowly than the smaller particles if the particles be of different sizes. Therefore, the combustion will progress from the outer surface of the briquet toward the center in an uneven manner, and this uneven combustion will frequently result in smoke.

If the particles are of substantially uniform size, the combustion will progress evenly and there will be a minimum of smoke. Therefore, another object of my invention has been to so assort the particles that the briquets may be made of particles of substantially uniform size.

In the production of bituminous coal, there is much material which is so small that it cannot be satisfactorily gasified, nor be burned on grates, and there is waste material which is undesirably high in incombustibles. It is also desirable to be able to reduce the percentage of sulfur and pyrites in bituminous coal to render it more salable for metallurgical purposes. By means of my apparatus the fine material can be successfully briqueted and the percentage of incombustibles and of sulfur and pyrites can be reduced. By means of my apparatus also the percentage of sulfur and pyrites can be reduced in bituminous coal of any size by crushing it down, if necessary, and then passing it through my apparatus.

My invention is capable of embodiment in many different forms of apparatus, and the particular form chosen is merely illustrative of its principles.

I shall describe my apparatus as operating upon culm, because in such operation its advantages appear most fully.

The culm is carried away from the breaker by currents of water falling through what are known as "slush chutes", and thus when the culm leaves the breaker it is saturated with water. In preparation for treatment by my apparatus, the culm is received from the slush chutes in cars and is permitted to stand therein until all the water which will drain has drained out. Thus the percentage of water which has to be driven off by heat is reduced to a minimum.

The first step in the treatment of the culm by my apparatus is drying the culm to drive off the remainder of the moisture. This may be accomplished by any form of drier. That form of drier which I have chosen for illustration is as follows: The drier comprises a cylinder mounted in an inclined position in a casing, the cylinder being rotated upon its axis. The material to be dried is fed into the upper end of the cylinder and travels through the cylinder, owing to the inclination and the rotation of the latter, and is heated and dried during its passage through the cylinder.

In the accompanying drawings, the cylinder 1 has an upper shaft 2 and a lower shaft 3 secured in it by means of spiders, the shaft 2 being mounted in a bearing on a pier at the front of the drier, and the shaft 3 being mounted in a bearing on the rear wall of the drier. The cylinder is prevented from slipping to the left in Fig. 3 by means of a collar on the upper end of the shaft. The shaft 3 is provided with a wheel 4, or other means for rotating it. The front wall 5 of the drier has an opening to receive the end of the cylinder, and a flanged plate 6 closes the opening in the wall, the flange 7 projecting slightly into the cylinder. A chute 8, to receive the culm, is fastened to the said plate and opens through the latter. The material to be dried is fed into the open upper end of the chute and passes into the cylinder. The cylinder is inclosed in a chamber formed by the front wall 5, a rear wall 9, side walls 10 and 11, and a top wall 12. A gas burner 13 is mounted in the front wall, and throws its flame rearward through an opening in such wall. The flame is received in a chamber formed by the wall 5, a rear wall 14, the side walls 10 and 11, and an arched top 15. The rear wall 14 is checkered. The gases of combustion, after passing through the checkered wall, pass around the cylinder and escape through an opening 16 in the top wall 12, and thus enter a horizontal passage 17, formed on the said top wall. In the passage 17 there is a damper 18 at the front of the opening 16, and a damper 19 to the rear of such opening. At the rear end of the cylinder a vertical passage is formed in the rear wall, which passage opens at its upper end into the passage 17, and at its lower end is contracted to form a chute 20. At its forward end the passage 17 is connected by a pipe 21 with a dust chamber 22 built preferably at the side of the drier proper. The pipe 21 is provided with a damper 23. The dust chamber has a stack 24 opening through its roof, and is provided with a hopper-shaped bottom; that is, with a bottom formed of inclined sides, and a conveyer 25, or other form of conveyer, is mounted in its bottom, suitable gearing being provided for driving the conveyer. A fan 26 has its suction pipe 27 connected with the passage 17 and its delivery pipe 28 connected with the dust chamber. Air spaces 29 are provided in the side walls 10 and 11, which are open to the outer air at and by ducts at the lower ends, and which communicate with the cylinder chamber by ducts at their upper ends.

In the drying of material by means of the illustrated drier, the material enters the drier through the chute at the forward end, and passes into the cylinder. The heat from the gas burner first reaches the outer side of the cylinder and then passes up through the opening 16 under suction of the fan. If it is desired to have the gases pass through the cylinder, the damper 18 is closed, and the damper 19 opened, thus causing the gases to pass rearward and downward, and to enter the rear end of the cylinder. They thence pass forward and are drawn through the pipe 21 by the suction of the fan, and are forced into the dust chamber. The gases when passing in this manner carry a certain amount of the dust of the material with them into the dust chamber. The dried material falls into the chute 20 and is carried by a conveyer to the separator, which forms the next element of my apparatus. If it is not desired to have the gases pass through the cylinder, the rear damper 19 is closed and the forward damper 18 opened, and the gases pass by means of the passage 17 directly to the fan and by it are forced into the dust chamber. In this instance, the damper 23 in the pipe 21 will be closed. The cylinder is provided inside with ledges formed by angle irons, which pick up the material as they pass through the lower portion of their path, and drop the material as they are inverted in passing through the upper portion thereof. From the chute 20 of the drier the material passes to the separator which separates the dust and incombustible material of the culm from the portion thereof which is sufficiently rich in carbon, and that is large enough to briquet, and which also properly grades the material as to size. So far as the complete apparatus, which is the subject of the present application is concerned, the said separator may be constructed in any manner so long as it leaves the culm in a dry condition.

The separator which I have chosen for illustration is one which is the subject of another application for patent, and it is therefore not specifically claimed in the present application. Such separator, as illustrated in Figs. 4, 5 and 6, comprises a framework supporting in its upper portion rollers 40 and 41, over which runs a belt 42, upon which the culm is deposited from the conveyer of the drier. The upper surface of the belt runs toward the left in Fig. 4. Beneath the roller 40, and in position to catch the falling culm, is a hopper 43, having parallel vertical sides, and inclined bottoms 44 and 45. The inclined bottom 45 stands a little above the bottom 44, so that the culm may slide down the latter and beneath the former. The culm thus falls from the lower end of the bottom 44 in a uniform stream. The lower end of the bottom 44 extends into a closed chamber, preferably having a width approximately equal to that of the said bottom, and having side walls 46 and 47 parallel to each other, and preferably having a length and height approximately equal. The chamber is closed by front and rear walls 48 and 49, respectively, and by a roof 50. The bottom of the chamber is closed by three bins 51, 52 and 53, respectively, which bins together occupy the entire bottom. Each bin is closed by a "hopper bottom" having in it a sliding door 54, and which door has beneath it a belt 55, that is adapted to carry away the material falling through the door. Over each division wall of the bins, I preferably arrange a movable rider or guard 56. This rider or guard has forwardly and rearwardly inclined upper faces meeting at an apex, and it can be shifted over a division wall between the bins, forward or back, within the limits of the length of its base, thus in effect shifting the division wall between the bins so as to exactly divide the material which is to go into the respective bins. In the front wall 48 is an opening 57, that is preferably well up toward the level of the lower end of the bottom 44. In the rear wall 49 is an opening 58, whose area is larger than the opening 57 in the front wall. I find good results to be obtained by making the rear opening approximately twice the area of the front opening. The height of the rear opening is determined by the special conditions, which will be stated later in describing the operation of the apparatus. At the rear of the separator chamber proper is a chamber formed by the wall 49, and a partition 59, which, starting at its foot, near the wall 49, preferably extends upward and rearward at a slight inclination to form a hopper-like bottom, the said partition extending to the roof, and the said chamber being closed at the sides by side walls 46 and 47. An opening 60 is formed in the partition 59, approximately opposite the opening 58, and a suction fan 61, or other form of suction apparatus, is connected with said opening to exhaust air from the space inclosed, and thus to draw air through the opening 58.

The principle of the illustrated dry separator is based on the discovery that the finer dust in culm is the part thereof highest in percentage of incombustible material. It has heretofore been believed that the dust in culm was largely pure coal. This separator is also based on the further discovery that by means of a current of air formed by suction produced under certain conditions near a falling stream of culm, I can separate this fine, comparatively incombustible material from the larger more useful material, and can also assort the larger material to great advantage. In the said separator the opening between the bottom 45 and the bottom 46 is adjusted to permit the passage of a stream of culm of sufficient quantity to make rapid operation possible, but not of sufficient thickness to prevent advantageous action of the air. The suction apparatus being in operation, a strong current of air enters through the opening 57, and striking the falling stream of culm, causes the particles to fall at greater or less distances rearward of the vertical, according to the size and weight of the particles. The bony coal, pyrites and larger particles of coal fall into the bin 51. The briqueting material which is high in carbon and not too fine falls into the bin 52, and the dust and material which is too fine for briqueting, and which contains incombustible material in the form of powder falls into the bin 53.

The various factors influencing the separation may be stated as follows: The suction causes the air to pass in substantially straight lines from the opening 57 to the opening 58, and an accurate separation of the material according to the size and specific gravity is effected. I have found that if a blast be forced through the opening 57 instead of a suction drawn through the opening 58, great confusion will occur within the chamber and efficient separation will not take place. The velocity of the air is adjusted to the size of the coal being treated; the larger the coal, the higher the velocity. If the velocity of the air is too low, it does not sufficiently spread the material. The velocity should also be regulated according to the temperature, to obtain the best results. The partitions between the various bins are located according to the speed of the air to be used, since it is evident that if the velocity of the air be increased, the material which should fall into the bin 50 will fall into bin 51, and so with the bins 52 and 53. As it is inconvenient to shift the partitions after the apparatus is once constructed, such shifting in effect is obtained by means of the riders. If the culm has incombustible material in comparatively large pieces, the front rider is moved somewhat to the rear. If the incombustible material in the shape of impalpable powder is present to an unusual extent, the rear rider is moved forward. If a high velocity of the air is required, both riders will be moved rearward, and vice versa. I find it advantageous to place the opening 57 well up toward the level of the bottom 44, because the air in this position strikes the material before it has acquired much velocity, and therefore the material is subjected to the action of the current of air for a longer time than it would be if the opening were lower down. This is of importance, because I find that if the front opening be made too large, a good separation of the coal and incombustible material is not effected. I find the best results to be obtained by making the area of the rear opening larger than that of the front opening. I also find it is advantageous to locate the rear opening higher or lower, according to the particular conditions. A certain amount of the incombustible dust can be carried through this opening into the chamber in the rear. If the opening be too high, the dust does not pass through it as well as if it be lower. I have also found that if the coal be flaky, it is more easily carried by the air, and it is then an advantage to have the rear opening high; whereas, if the coal be granular, it is with more difficulty carried by the air, and it is more advantageous to have the rear opening low. The coal is flaky or granular according to the wood of which it is formed, and usually the bulk of the material being treated at any one time will all be of the same general character; that is, flaky or granular. A door into the rear chamber of any convenient sort is provided, so that the dust may be removed therefrom. While I have indicated the conditions to obtain the best results with my separator, a fair result can be obtained notwithstanding many of such conditions are not observed. It will thus be seen that the agents controlling the various conditions of my separator are the relative cross sections and locations of the front and rear openings to each other, and to the bins, the velocity of the air and the location of the riders. The bony coal, pyrites and large particles of coal falling into the bin 51 are carried by its belt 55 to a gas producer 62, of any desired type. As no particular type of gas producer is required, the gas producer is not illustrated in detail. The material in the bin 52, which is high in carbon and suitable for briqueting, is carried by the belt 55, of such bin, to the briqueting machine 64, and there briqueted. The briqueting machine may be of any desired type, and as its construction is well known it is not here illustrated.

I desire to burn the dust and material high in carbon in the bin 53, and from such combustion, together with the heat from the gas producer, and heat to be obtained from dust separated in the drier, to produce all the heat utilized in the entire process. I therefore convey the material from the bin 53 by its belt 55, and also the material from the dust chamber of the drier, to a furnace 67. This furnace, so far as the general combination which is the subject of the present application is concerned, may be of any type which will burn the dust referred to. I have illustrated a furnace which I have invented, and which is the subject of a separate application for patent.

Dust does not burn well on a grate. It packs too tightly and if there be enough pressure of air to supply the air needed for combustion, it "honeycombs" the bed, and results in too much air passing through in some places and not enough in others, and in blowing the dust through the furnace without burning it. If there be not enough air, it results in a dull, red, smoldering fire. The furnace referred to has been devised to overcome these objections. The essential feature of my said furnace is that the dust is deposited on a surface preheated to a sufficiently high degree, preferably to incandescence, so that the carbon of the dust unites with the oxygen to form carbonic oxid, and such gas is then burned. I prefer to heat the said surface by gas produced from the beforementioned gas producer.

Specifically, my furnace comprises side walls 68, a front wall 69, a rear wall 70, and an arched roof 71. Within the said walls are longitudinal, vertical walls 72, which support a comparatively thin plate, bed, or combustion surface 73, that is preferably formed of refractory material, such as silica tile. The said bed is supported at intermediate points by vertical longitudinal partitions 74, which are supported upon a bridge piece 75, somewhat above the level of the ground. Webs 76 connect the partitions 74 at a level intermediate their upper and lower edges, and thus there are formed four upper passages 77, and four lower passages 78, extending longitudinally. At the rear end of the combustion surface is preferably a bridge wall 79, and above it an opening 80 for the escape of gases beneath the boiler. The passages 77 also communicate by openings 81 with the space beneath the boiler. Each passage 77 has at its forward end a burner 82 that is supplied by gas from the gas producer. The coal dust is deposited by the belt 55, of the bin 53, and by a conveyer from the dust chamber of the drier, in a hopper 83, and passes from said hopper, as by pipes 84 to openings 85 in the roof 71 above the combustion surface, and the dust is thus deposited upon the combustion surface. Air to burn the carbonic oxid, formed by the heating of the dust upon the combustion surface, enters the furnace by openings 86, at the sides, and passes to the forward ends of the passageways 78. It here divides, and passing through said passageways, reaches the forward end of the furnace, it having been heated by passing beneath the floor formed by the webs 76, which form the bottoms of the combustion chambers. The air at the forward end of the furnace enters lateral passageways 87, and thus reaches vertical spaces between the walls 72, and the side walls 68. In this manner the air rises to, and passes over the combustion surface, and there, in its preheated condition, combines with the carbonic oxid of the culm dust. In order that the incombustible material may be scraped off the combustion surface, doors 89 are provided in the side walls of the furnace to give access to such surface. The ashes thus formed fall through the passageways 88, and are removed at the bottom through doors 90.

In the operation of the said furnace, the burners fed by the producer gas, heat the combustion plate preferably at least to a red heat and preferably to incandescence. These gases pass under the boiler and serve to heat it. The culm is deposited on the combustion surface, preferably in a thin layer, and is there quickly heated, and its carbonic oxid liberated. The carbonic oxid unites with the air which has been preheated by passing through the passages beneath and around the chambers 77, in which the producer gas is burned, and thus highly efficient combustion of the carbonic oxid occurs. The gases from this combustion pass beneath the boiler. By the use of the said furnace, the dust from the bin 53, of the separator, and from the drier, is burned under beneficial conditions, and this together with the gas of the gas producer, produces not only sufficient heat and power for all purposes of my apparatus, but also produces a surplus of power. Thus the dust, which is a waste material, and which is a large percentage of the entire bulk of the culm, is rendered useful, and serves a purpose which would otherwise require the valuable coal or briquets. The gas from the producer is not only used to supply direct heat by combustion for my furnace, and to heat the drier, the pitch-melting apparatus, the briqueting machine, and the preheater and mixer of the latter, but it may also supply energy by combustion in internal combustion engines to the rotary drier, to the separator, to the briqueting apparatus, elevators, conveyers, etc., and also preheats the surface on which the dust is burned.

With my apparatus it is not necessary to either dry the culm when wet with an excess of water, such as would be present if it were just taken from a wet separator, or to handle it and store it while waiting for such excess to drain off.

No fuel from any outside source needs to be supplied to my apparatus. All of the useful material is utilized (that which is large enough so as not to require an excessive quantity of pitch to briquet it), and yet all the heat and power required are produced by burning carbon in the waste material, which is either too fine to be briqueted, or in the bony coal and very large particles.

While I have illustrated the best form of my apparatus so far as known to me, there are many machines which can be made without seriously impairing the result, and it is obvious that equivalents can be substituted for many of the elements and parts therein. I therefore desire not to be limited beyond the requirements of the prior art and the necessary intendment of my claims.

The general processes illustrated herein and practiced by the said apparatus are not claimed in the present application, but are the subject of a separate application for patent. The process of separating coal and the waste materials thereof is likewise the subject of a separate application for patent, and the furnace and the process of burning the dust and other fine material therein are also the subjects of separate applications for patent.

I claim:

1. An apparatus for briqueting fine coal and the waste materials of coal, comprising the combination of a means for substantially drying said coal, a separator for separating the incombustibles from the briquetable material, a briqueting machine, and means for conveying the material from the drier to the separator, and the briquetable material from the separator to the briqueting machine.

2. An apparatus for briqueting fine coal and the waste materials of coal, comprising the combination of a means for substantially drying said coal, means for separating the dust from the briquetable material, a briqueting machine, and means for conveying the material from the drier to the separator and for conveying the briquetable material from the separator to the briqueting machine.

3. An apparatus for briqueting fine coal and the waste materials of coal, comprising the combination of a means for substantially drying said coal, means for separating the unbriquetable material from the briquetable material, a briqueting machine, means for conveying material from the drier to the separator, means for conveying briquetable material from the separator to the briqueting machine, and means for burning the unbriquetable material and applying the heat therefrom to the drier.

4. An apparatus for briqueting fine coal and the waste materials thereof, comprising the combination of a means for substantially drying said coal, means for separating the unbriquetable material from the briquetable material, means for burning such dust, a briqueting machine, means for conveying the heat from the burning unbriquetable material to the drier, and means for producing power from the burning unbriquetable material to operate the apparatus.

5. An apparatus for briqueting fine coal and the waste materials thereof, comprising the combination of a means for substantially drying said coal, means for separating the briquetable material, the dust, and the bony coal into different receptacles, means for producing gas, a furnace having a combustion surface, means for heating said surface by said gas, means for conveying the material from the drier to the separator, means for conveying the bony coal to the gas producer, means for conveying the dust to said combustion surface, a briqueting machine, and means for conveying the briquetable material from the separator to said machine.

6. An apparatus for briqueting fine coal and the waste materials thereof, means for substantially drying comprising the combination of a pneumatic separator for separating the dust and briquetable material, means for conveying the material from the drier to the separator a briqueting machine and a conveyer for conveying the material from the separator to the briqueting machine.

7. An apparatus for briqueting fine coal and the waste materials thereof, comprising the combination of a means for substantially drying said coal, a pneumatic separator for separating the dust and briquetable material, a briqueting machine, a conveyer for conveying material from the drier to the separator, and a conveyer for conveying the briquetable material to the briqueting machine.

8. An apparatus for briqueting fine coal and the waste materials thereof, comprising the combination of a drier having means for separating dust from the briquetable material, a separator for separating the briquetable material, the bony coal, and the dust into different receptacles, a gas producer, a furnace having a combustion surface, a briqueting machine, means for conveying dust from the drier to the combustion surface of the furnace, means for conveying the remaining material from the drier to the separator, means for conveying the bony coal from the separator to the gas producer, means for conveying the briquetable material from the separator to the briqueting machine, means for conveying the dust from the separator to the combustion surface of the furnace, and means for heating said combustion surface by gas from the gas producer.

9. An apparatus for briqueting fine coal and the waste materials thereof, comprising the combination of a drier having means for separating dust from the material, a separator for separating the briquetable material, the bony coal and the dust into different receptacles, a gas producer, a furnace having a combustion surface, a briqueting machine, means for conveying dust from the drier to the combustion surface of the furnace, means for conveying the remaining material from the drier to the separator, means for conveying the bony coal from the separator to the gas producer, means for conveying the briquetable material from the separator to the briqueting machine, means for conveying the dust from the separator to the combustion surface of the furnace, means for heating said combustion surface by gas from the gas producer, and means for obtaining power for driving the apparatus from one of said apparatuses for burning the material not briqueted.

In testimony that I claim the foregoing I have hereunto set my hand.

GEORGE BERNHARDT DAMON.

Witnesses:
T. L. HODGE,
ROBT. V. PIERCE.